United States Patent

[11] 3,607,617

[72] Inventor John Drew
Jacksonville, Fla.
[21] Appl. No. 751,425
[22] Filed Aug. 9, 1968
[45] Patented Sept. 21, 1971
[73] Assignee SCM Corporation
Cleveland, Ohio

[54] TURPENTINE RECOVERY FROM THE WET GASEOUS EFFLUENT OF WOOD-PULPING PROCESSES
7 Claims, 2 Drawing Figs.

[52] U.S. Cl. .................................................. 162/15,
55/80, 162/239, 210/83
[51] Int. Cl. ...................................................... D21c 11/06
[50] Field of Search............................................ 162/15, 16,
52, 239, 242; 55/80, 85; 210/69, 83; 203/87;
202/198, 199; 260/675.5

[56] References Cited
UNITED STATES PATENTS
3,492,198 1/1970 Rosenblad.................... 162/15
OTHER REFERENCES
Tate, Dan C. " Typical Turpentine Recovery System For Batch Digesters" TAPPI. Vol. 50 No. 4 Apr., 1967

Primary Examiner—S. Leon Bashore
Assistant Examiner—Alfred D'Andrea, Jr.
Attorneys—Merton H. Douthitt, Harold M. Baum and Howard G. Bruss, Jr.

ABSTRACT: This application discloses a method and apparatus for improving the recovery of turpentine from the gaseous byproducts of wood-pulping processes through improved condensation and decantation processes. The turpentine recovery is improved by condensing the wet gaseous effluent from a wood-pulping process to produce a condensate containing turpentine and water, and then decanting the turpentine phase from the water phase at a temperature that ranges from at least about 125° F., to the boiling point of the condensate thereby reducing turpentine losses with the aqueous underflow from the decanter.

The wet gaseous effluent can be condensed and cooled at conventional condensing temperatures (i.e. 90° F.–110° F.) in which case the condensate is warmed to 125° F. or higher before decanting.

Alternatively and preferably the wet gaseous effluent is condensed and cooled to a temperature ranging from at least about 125° F. to the boiling point of the condensate and the immiscible phases are separated without additional heat exchange. In this preferred embodiment vent gases from the condenser must be further cooled to prevent the loss of turpentine as uncondensed vapor.

PATENTED SEP 21 1971　　　　　　　　　　　　　　3,607,617

TURPENTINE RECOVERY FROM THE WET GASEOUS EFFLUENT OF WOOD-PULPING PROCESSES

This invention relates to improvements in the recovery of turpentine from wood-pulping processes. More particularly, this invention pertains to an improved method for condensing and separating turpentine and water from the wet gaseous digester effluent, in continuous and batch wood-pulping processes. In either type of process the turpentine recovery is "continuous" in that the turpentine is recovered as it is liberated from the pulping process.

In wood-pulping processes, a digester vessel is charged with wood chips and an alkaline solution of cooking liquor. The wood chips are then digested at elevated temperatures (e.g. 340° F. to 355° F.) and pressures (e.g. 100 to 125 p.s.i.) to produce fibrous wood pulp and gaseous byproducts containing water, turpentine, and other valuable chemicals. This wet gaseous effluent passes from the digester to a centrifugal separator to remove entrained cooking liquor and pulp, and then to a indirect heat exchanger where the vapors are condensed and subcooled to temperatures varying from about 50° F. and lower, to about 120° F. In conventional systems the condensate temperature is controlled at about 90° F. to 110° F. in an effort to minimize the loss of turpentine through the condenser and decanter vents. In the past it was believed that turpentine losses increased with condensing and decanting temperatures above 120° F. (See "Typical Temperature Recovery System for Batch Digesters" by Dan G. Tate, TAPPI Journal, Vol. 50, No. 4, Apr. 1967; "Sulfate Temperature Recovery considerations for Obtaining Maximum Yield" by Robert Wier III and Floyd Diephuis, Southern Pulp and Paper Manufacturer, Jan. 10, 1958; and "A Study of the Temperature Recovery at St. Regis," by Daniel P. Pierce, Southern Pulp and Paper Manufacturer, Mar. 10, 1967.)

The condensate comprises a turpentine phase and an aqueous phase. The condensate flows to a decanter (i.e., a settling chamber) where the turpentine and water separate by gravity. The aqueous underflow from the decanter is discarded, and the turpentine overflow is passed to storage.

In conventional practice the condensate flows directly to the decanter without additional heat exchange and the "decanting" takes place at the condenser outlet temperature which is usually between 90° F. and 120° F.

Under these thermal conditions, a great deal of turpentine is lost in the aqueous underflow stream. This loss of turpentine is caused by two factors. Water and turpentine have a tendency to form an emulsion at the interface of their liquid phases at low temperatures. This emulsion is often discarded with the aqueous phase. Additionally, there is a limited interphase solubility of turpentine in water which decreases with increasing temperature.

The present invention provides a method of materially reducing the amount of turpentine lost in the aqueous underflow stream, either as an emulsion or by interphase solubility.

It has now been discovered that emulsion losses and interphase solubility losses of turpentine can be reduced by decanting the turpentine from water at a temperature that is above the conventional condensing and decanting temperature.

According to one feature of the present invention, the wet gaseous effluent from the digester is dephlegmated in an indirect heat exchanger at a temperature ($T_1$) which is at lest about 125° F. (e.g., about 140° F. to about 200° F.), and the resulting immiscible condensate phases are separated by decantation at a temperature $T_2$ which is above 125° F. (e.g. about 140° F. to about 200° F.). The uncondensed turpentine vapors vented from the dephlegmator are further cooled and condensed with cold water in a contact condenser.

According to a second feature of the present invention, the dephlegmation temperature $T_1$ is the conventional dephlegmation temperature (e.g. 90° F. to 120° F.) or as low as the available cooling water will allow. The condensate is then heated to the separation temperature $T_2$ which is between about 125° F. and the boiling point of the condensate and preferably as high as practical because the solubility of turpentine in water decreases with increasing temperatures. According to this second feature, further condensing of vent gases from the dephlegmator is often not required.

These features minimize turpentine solubility losses as well as the tendency for the formation of intense emulsions.

The term "Dephlegmate" as used herein refers to the condensation (or partial condensation) of a vaporous stream to a specified condensate temperature. Dephlegmating to 140° F., then, describes the condensation process wherein the temperature of the condensate leaving the condenser is 140° F.

The decanting of the turpentine from the water can be carried out at any practical temperature that is above 125° F. and below the boiling point of the condensate. Higher decanting temperatures (e.g. 140° F. to 180° F.) are preferred because the solubility of water in turpentine decreases with increasing temperature. Additionally, the tendency of water/turpentine emulsions also decreases with increasing decanting temperature. The boiling point of the condensate is, of course, the practical upper limit on the decanting temperature, because the boiling turbulence will prevent efficient separation.

The above and other advantages of the present invention will be more apparent from the following description and drawings wherein.

The present invention is described below in terms of a conventional wood-pulping process. While the invention is applicable to both continuous and batch wood-pulping processes, a detailed description of the process is given with reference to a batch process.

Figure 1:
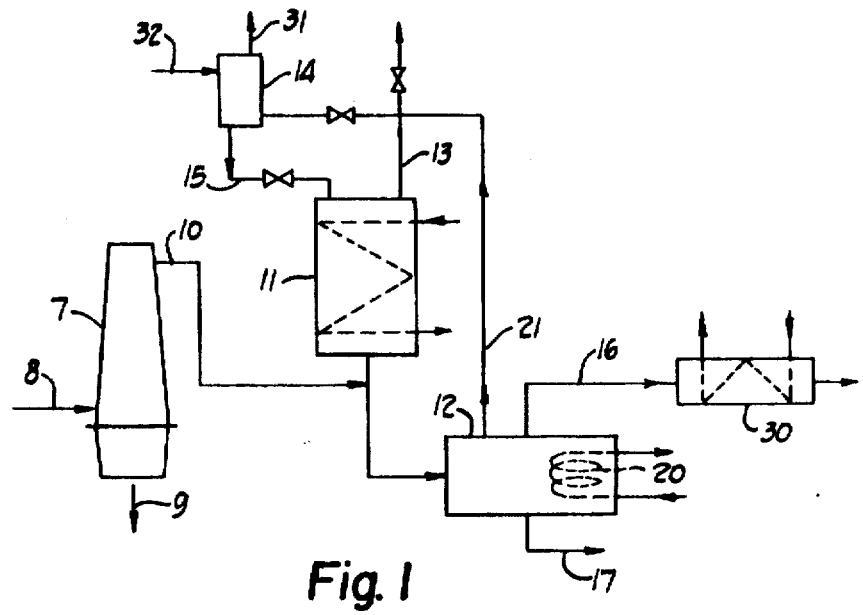
FIG. 1 is a schematic flow diagram illustrating the recovery of turpentine from wet gaseous digester effluent according to the present invention.

FIG. 1 illustrates a typical wood-pulping process wherein about 1,509 tons of pine chips (containing about 48 percent moisture and about 1,675 gallons of available turpentine) are digested at about 350° F. and about 120 p.s.i. in a batch digester (not shown) in a conventional "sulfate" cooking liquor to yield about 874 tons of wood pulp. The digester off gas stream 8 contains turpentine vapor, water vapor, noncondensable gases, and entrained cooking liquor and wood pulp. Stream 8 passes through centrifugal separator 7 where any entrained cooking liquor and wood pulp are removed in stream 9 for recovery. Of the available 1,675 gallons of turpentine in the wood chips about 1,200 gallons are present as turpentine vapor in effluent stream 10. (The equivalent of about 475 gallons of turpentine remains in the digester in the cooking liquor and pulp, and is removed by subsequent washing and chemical recovery operations.) Stream 10 also contains the equivalent of 32,500 gallons of water as uncondensed vapor. Stream 10 flows into indirect heat exchanger 11 where the vapors are dephlegmated to a Temperature $T_1$ of about 130° F. The resulting condensate flows into decanter (settling chamber) 12 where liquid turpentine is separated from liquid water by gravity.

Figure 2:
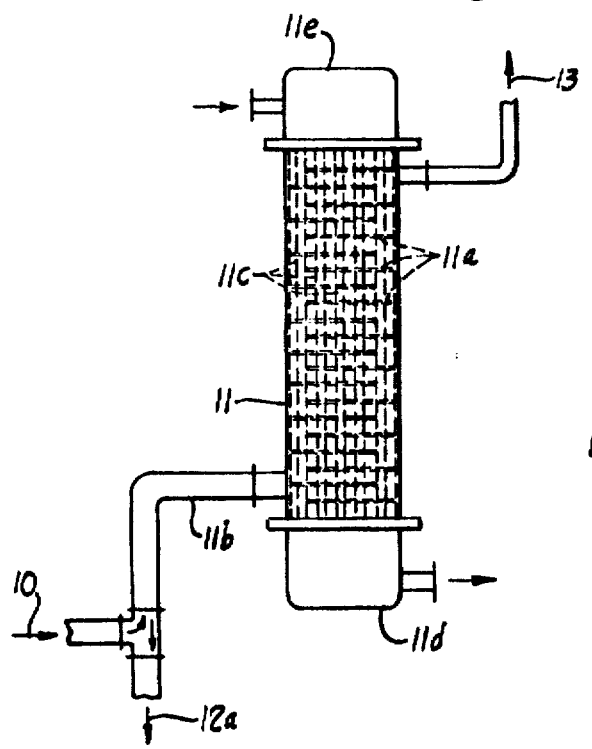
FIG. 2 illustrates heat exchange apparatus suitable for practicing the present invention.

FIG. 2 illustrates an indirect heat exchange apparatus 11 suitable for accomplishing the dephlegmation of wet gaseous digester effluent. As shown in FIG. 2, the heat exchange apparatus 11 has a common vapor inlet and condensate outlet 11b, wherein the wet gaseous digester effluent contacts the condensate stream 12a as it flows to the decanter, thus providing direct heat exchange between the two streams. This serves to warm the condensate as it flows to the decanter while cooling the vapors entering the condenser. The heat exchanger shown is a "tube-in-shell" type condenser with coolant in the tube and vapor in the shell. The shell is equipped with a series of internal baffles 11a which insures intimate contact between the vapor and condensate mixture therein. The coolant flows through tubes 11c through headers 11d and 11e. The coolant flow is shown as countercurrent to the vapor flow although the heat exchanger shown has a common vapor inlet and condensate outlet. A conventional horizontal heat exchanger having a separate vapor inlet and condensate outlet can also be used. This conventional type of exchange can be used when subcooling of the condensate is not desired.

Referring again to FIG. 1, uncondensed vapors from the heat exchanger 11 leave in stream 13 and flow to scrubber 14 (alternatively, stream 13 can be vented to the atmosphere when the dephlegmation temperature is below 125° F.). Scrubber 14 is a conventional cold water scrubber comprising a chamber such as a packed column, wherein direct contact between vapors and cold water is effected. The cold water 32 enters the column and is distributed over the top of the packing. Through direct contact the remaining turpentine vapors are condensed to a temperature within a few degrees of the temperature of the available cooling water 32. Noncondensables are vented from the scrubber in stream 31 while scrubber condensate stream 15 can be returned to heat exchanger 11. (No specific inlet for stream 15 is shown in FIG. 2.) Alternatively, stream 15 can be passed directly to the decanter 12.

The condensate flowing to decanter 12 from heat exchanger 11 has been warmed from the dephlegmating temperature of 130° F. to a temperature of about 160° F. by direct contact with the incoming vapors from stream 10. (THe condensate can be further warmed to temperatures as high as the boiling point if desired by steam coil 20.) The condensate (at 160° F.) separates into overflow stream 16 comprising 1,180 gallons of turpentine, and aqueous underflow stream 17 carrying with it about 20 gallons of emulsified and/or soluble turpentine. Turpentine stream 16 is cooled for storage, in indirect heat exchanger 30. Decanter 12 is provided with vent line 21 which flows to scrubber 14. This prevents turpentine vapor loss at the elevated decanting temperatures.

This increased decanting temperature substantially reduces the turpentine loss in the aqueous underflow because the higher temperature tends to "break" water/turpentine emulsions. Additionally, the solubility of turpentine in water decreases with increasing temperature. For example, when the process conditions described above are duplicated except that the decanting temperature is about 90° F., stream 16 comprises about 960 gallons of turpentine while the aqueous underflow stream 17 carries away about 240 gallons of turpentine.

From the foregoing, it is apparent that a novel method and apparatus for condensing and recovering turpentine from a wood-pulping process is provided.

Having thus described the invention, what is claimed is:

1. In the recovering of turpentine from wet gaseous effluent from a wood-pulping process wherein turpentine vapor and water vapor are condensed and the resulting immiscible phases are separated by density differential into a turpentine overflow phase and an aqueous underflow phase;

the improvement which comprises the steps of dephlegmating said effluent to a temperature $T_1$ to produce a condensate containing immiscible turpentine and water phases, collecting said condensate, venting uncondensed gases from said dephlegmating step, and separating the immiscible condensate phases at a temperature $T_2$, wherein $T_2$ is a temperature ranging from about 125° F. to the boiling point of said condensate.

2. The improvement of claim 1, wherein $T_1$ is at least about 125° F.

3. The improvement of claim 2 wherein $T_2$ is established at least in part by direct heat exchange between said gaseous effluent and said condensate.

4. The improvement of claim 2 wherein said gases vented from the dephlegmating step are further cooled by direct contact with cold water and the resulting liquid phase returned to the dephlegmating step.

5. The improvement of claim 2 wherein said gases vented from the dephlegmating step are further cooled by direct contact with cold water and the resulting liquid phase returned to the separating step.

6. The improvement of claim 2 wherein $T_1$ and $T_2$ are in the range of about 140° F. to 200° F.

7. In the recovery of turpentine from wet gaseous effluent from a wood-pulping process, the continuous recovery process comprising the steps of:

separating entrained cooking liquor from said wet gaseous effluent, dephlegmating said effluent to a temperature of at least about 125° F. to produce a condensate containing immiscible turpentine and water phases, collecting said condensate, venting uncondensed gases from said dephlegmating step, decanting said turpentine phase from said water phase at a temperature ranging from about 125° F. to the boiling point of said condensate, cooling said turpentine phase, and condensing and recovering uncondensed turpentine from said uncondensed gases by direct contact with cold water.